United States Patent
Martinez et al.

(10) Patent No.: US 10,174,675 B2
(45) Date of Patent: Jan. 8, 2019

(54) ACOUSTIC LINER FOR GAS TURBINE ENGINE COMPONENTS

(71) Applicants: General Electric Company, Schenectady, NY (US); MRA SYSTEMS, INC., Baltimore, MD (US)

(72) Inventors: Michael Moses Martinez, Liberty Township, OH (US); Rudramuni Kariveerappa Majjigi, Cincinnati, OH (US); Steven Thomas Davies, Bel Air, MD (US); Egbert Geertsema, Cincinnati, OH (US)

(73) Assignees: General Electric Company, Schenectady, NY (US); MRA Systems, Inc., Baltimore, MD (US)

( * ) Notice: Subject to any disclaimer, the term of this patent is extended or adjusted under 35 U.S.C. 154(b) by 319 days.

(21) Appl. No.: 14/984,767

(22) Filed: Dec. 30, 2015

(65) Prior Publication Data
US 2017/0191414 A1 Jul. 6, 2017

(51) Int. Cl.
*F02C 7/045* (2006.01)
*B64D 33/02* (2006.01)
(Continued)

(52) U.S. Cl.
CPC .............. *F02C 7/045* (2013.01); *B64D 33/02* (2013.01); *F04D 29/664* (2013.01);
(Continued)

(58) Field of Classification Search
CPC ....... F02C 7/045; B64D 33/02; F04D 29/664; G10K 11/168; G10K 11/172
(Continued)

(56) References Cited

U.S. PATENT DOCUMENTS 3,070,198 A * 12/1962 Haskell .................. E04C 2/365
156/197
3,819,009 A 6/1974 Motsinger
(Continued)

FOREIGN PATENT DOCUMENTS

JP S58-156052 U 10/1983
JP H03-33897 A 2/1991

OTHER PUBLICATIONS

Jones, M.G. et al., "Evaluation of Parallel-Element, Variable-Impedance, Broadband Acoustic Liner Concepts", AIAA-2012-2194: Jun. 2012.
(Continued)

*Primary Examiner* — Jeremy Luks
(74) *Attorney, Agent, or Firm* — General Electric Company; Pamela Kachur

(57) ABSTRACT

A single degree of freedom (SDOF) acoustic liner includes a porous face sheet, a substantially imperforate back sheet generally parallel to and opposing said porous face sheet and defining a thickness therebetween, and an acoustic core layer of contiguous adjacent resonant cavities disposed between the porous face sheet and the imperforate back sheet. The acoustic core layer includes a first resonant cell having a first internal volume therein and a second resonant cell having a second internal volume therein different than the first internal volume. A cell partition wall extends between the porous face sheet and the imperforate back sheet, and separates and seals the first resonant cell from the second resonant cell. In a thickness direction, and perpendicular to a plane generally parallel with the porous face sheet and the substantially imperforate back sheet, the first internal volume overlaps the second internal volume over the cell partition wall.

14 Claims, 5 Drawing Sheets

(51) Int. Cl.
*F04D 29/66* (2006.01)
*G10K 11/168* (2006.01)
*G10K 11/172* (2006.01)

(52) U.S. Cl.
CPC .......... *G10K 11/168* (2013.01); *G10K 11/172* (2013.01); *B64D 2033/0206* (2013.01); *B64D 2033/0286* (2013.01); *F05D 2240/40* (2013.01); *F05D 2250/132* (2013.01); *F05D 2250/283* (2013.01); *F05D 2250/312* (2013.01); *F05D 2260/963* (2013.01)

(58) Field of Classification Search
USPC ........................................................ 181/292
See application file for complete search history.

(56) References Cited

U.S. PATENT DOCUMENTS

| | | | |
|---|---|---|---|
| 3,831,710 A | | 8/1974 | Wirt |
| 3,850,261 A | | 11/1974 | Hehmann et al. |
| 3,905,443 A | | 9/1975 | Sieuzac |
| 4,001,473 A | * | 1/1977 | Cook ................. B32B 3/12 428/116 |
| 4,035,535 A | * | 7/1977 | Taylor ................. G10K 11/172 181/292 |
| 4,265,955 A | | 5/1981 | Harp et al. |
| 4,291,080 A | | 9/1981 | Ely et al. |
| 4,298,090 A | * | 11/1981 | Chapman ................. F02C 7/24 181/286 |
| 5,445,861 A | | 8/1995 | Newton et al. |
| 6,182,787 B1 | | 2/2001 | Kraft et al. |
| 6,203,656 B1 | | 3/2001 | Syed |
| 6,206,136 B1 | | 3/2001 | Swindlehurst et al. |
| 6,209,679 B1 | | 4/2001 | Hogeboom et al. |
| 6,630,093 B1 | | 10/2003 | Jones |
| 6,871,725 B2 | | 3/2005 | Johnson |
| 6,913,570 B2 | | 7/2005 | Kehrle |
| 7,410,455 B2 | | 8/2008 | Akishev et al. |
| 7,866,377 B2 | | 1/2011 | Slaughter |
| 8,464,831 B2 | | 6/2013 | Olander Burak et al. |
| 9,302,869 B2 | | 4/2016 | Kendrick et al. |
| 9,365,022 B2 | | 6/2016 | Kendrick et al. |
| 2011/0244213 A1 | | 10/2011 | Jones |
| 2013/0306402 A1 | | 11/2013 | Todorovic |
| 2014/0251481 A1 | | 9/2014 | Kroll et al. |
| 2014/0305529 A1 | | 10/2014 | Kroll et al. |
| 2015/0027629 A1 | | 1/2015 | Butler et al. |
| 2015/0044413 A1 | | 2/2015 | Vauchel et al. |
| 2015/0064015 A1 | | 3/2015 | Perez |
| 2015/0110603 A1 | | 4/2015 | Biset et al. |
| 2015/0292413 A1 | | 10/2015 | Soria et al. |
| 2015/0373470 A1 | * | 12/2015 | Herrera .................. H04R 31/00 156/196 |
| 2016/0010863 A1 | | 1/2016 | Ott et al. |
| 2016/0067938 A1 | | 3/2016 | Goodrich |
| 2016/0109130 A1 | | 4/2016 | Stastny et al. |
| 2017/0072638 A1 | | 3/2017 | Hayes et al. |

OTHER PUBLICATIONS

Extended European Search Report and Opinion issued in connection with corresponding EP Application No. 16203393.0 dated May 16, 2017.

Office Action issued in connection with corresponding CA Application No. 2951801 dated Oct. 2, 2017.

Lin et al., Continuous degree of freedom acoustic cores, GE co-pending U.S. Appl. No. 15/421,935, filed Feb. 1, 2017.

Machine Translation and First Office Action and Search issued in connection with corresponding CN Application No. 201611256074.7 dated Jan. 22, 2018.

* cited by examiner

ACOUSTIC LINER FOR GAS TURBINE ENGINE COMPONENTS

BACKGROUND

The field of the disclosure relates generally to gas turbine engines and, more particularly, to acoustic liners for gas turbine engine components.

Aircraft engine noise is a significant problem in high population areas and noise-controlled environments. The noise is generally composed of contributions from various source mechanisms in the aircraft, with fan noise typically being a dominant component at take-off and landing. Fan noise is generated at the fan of the aircraft engine, propagates through the engine intake duct, and is then radiated to the outside environment. Acoustic liners are known to be applied on the internal walls of the engine's casing to attenuate the fan noise propagating through the engine ducts. Typical acoustic liners for engines are either a single degree of freedom (SDOF) liner, or a two degree of freedom (2DOF) liner, sometimes referred to as a double degree of freedom (DDOF) liner.

SDOF liners are formed of a porous facing sheet backed by a single layer of cellular separator such as honeycomb cells, which itself is backed by a solid backing plate that is substantially impervious to higher frequency noise transmission. 2DOF liners, on the other hand, are formed of two cellular layers between the porous facing sheet and the solid backing plate, with the two cellular layers separated by a porous septum sheet. The acoustic performance of both SDOF and 2DOF liners is strongly dependent on the depth of the cells in each honeycomb layer, where the cell depth controls the internal volume of the cell that is available for acoustic resonance. The additional layer of the 2DOF liner allows noise suppression of at least one other main frequency than the SDOF liner. However, the additional layer of the 2DOF liner significantly increases the weight of and cost to produce the liner.

At least some known SDOF honeycomb acoustic liners attempt to achieve the multiple frequency advantages of the 2DOF liner in an SDOF construction by forming individual cells within the core layer to have variable depths from the perforate facing sheet, thereby creating different resonant cavity volumes within the same SDOF layer. However, this variable depth construction requires a thicker core layer to accommodate the depth of longer individual cells that correspond to larger cavity volumes. Additionally, because some of the variable depth cells have shorter lengths, there is left a significant amount of solid material between the bottom of the shorter cell and the backing plate, which also increases the overall weight of the core layer.

BRIEF DESCRIPTION

In one aspect, a single degree of freedom (SDOF) acoustic liner includes a porous face sheet, a substantially imperforate back sheet generally parallel to and opposing said porous face sheet, and an acoustic core layer of contiguous adjacent resonant cavities disposed between the porous face sheet and the imperforate back sheet. A distance between the porous face sheet and the substantially imperforate back sheet defines a thickness of the acoustic core layer. The acoustic core layer includes a first resonant cell having a first internal volume therein and a second resonant cell having a second internal volume therein. The first internal volume is different than the second internal volume. A cell partition wall extends between the porous face sheet and the imperforate back sheet, and separates and seals the first resonant cell from the second resonant cell. In a thickness direction, and perpendicular to a plane generally parallel with the porous face sheet and the substantially imperforate back sheet, the first internal volume overlaps the second internal volume over the cell partition wall.

In another aspect, an acoustic honeycomb structure includes at least one heptad of contiguous adjacent resonant cavities arranged in a hexagonal grid formation. The heptad includes a central hexagonal tube having six lateral walls arranged evenly about a central tube axis, from a first opposing tube end to a second opposing tube end. The six lateral walls define a first central hexagonal base opening at the first opposing tube end and a second central hexagonal base opening at the second opposing tube end. The heptad further includes six adjacent hexagonal tubes radially surrounding the central hexagonal tube about the central tube axis. Each of the six adjacent hexagonal tubes extends from the first opposing tube end to the second opposing tube end and includes a first adjacent hexagonal base opening at the first opposing tube end and a second adjacent hexagonal base opening at the second opposing tube end. The first central hexagonal base opening is generally parallel to the second central hexagonal base opening. The first adjacent hexagonal base opening is generally parallel to the second adjacent hexagonal base opening. The second central hexagonal base opening is larger than the first central hexagonal base opening.

In yet another aspect, a gas turbine engine includes a fan assembly having a plurality of circumferentially spaced fan blades powered by power turbine, a fan casing surrounding the fan assembly, and an acoustic liner disposed between the fan assembly and the fan casing. The acoustic liner includes a porous face sheet facing the fan assembly, a substantially imperforate back sheet generally parallel to and opposing the porous face sheet, and an acoustic core layer of contiguous adjacent resonant cavities disposed between the porous face sheet and the imperforate back sheet. A distance between the porous face sheet and the substantially imperforate back sheet defines a thickness of the acoustic core layer. The acoustic core layer includes a first resonant cell having a first internal volume therein and a second resonant cell having a second volume therein. The first internal volume is different than the second internal volume. A cell partition wall extends between the porous face sheet and the imperforate back sheet, and separates and seals the first resonant cell from the second resonant cell. In a direction perpendicular to a plane generally parallel with the porous face sheet and the substantially imperforate back sheet, the first internal volume overlaps the second internal volume over the cell partition wall.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. Additionally, well-known elements, devices, components, methods, process steps and the like may not be set forth in detail in order to avoid obscuring the invention.

A system of attenuating turbine engine noise is described herein. Features of the discussion and claims may be applied to various classes of engines including, turbojets, turbofans, turbopropellers, turboshafts, ramjets, rocket jets, pulse-jets, turbines, gas turbines, steam turbines, commercial engines, corporate engines, military engines, marine engines, etc. As used herein "turbine engine" includes engines other than, and in addition to, aircraft engines.

Figure 1:
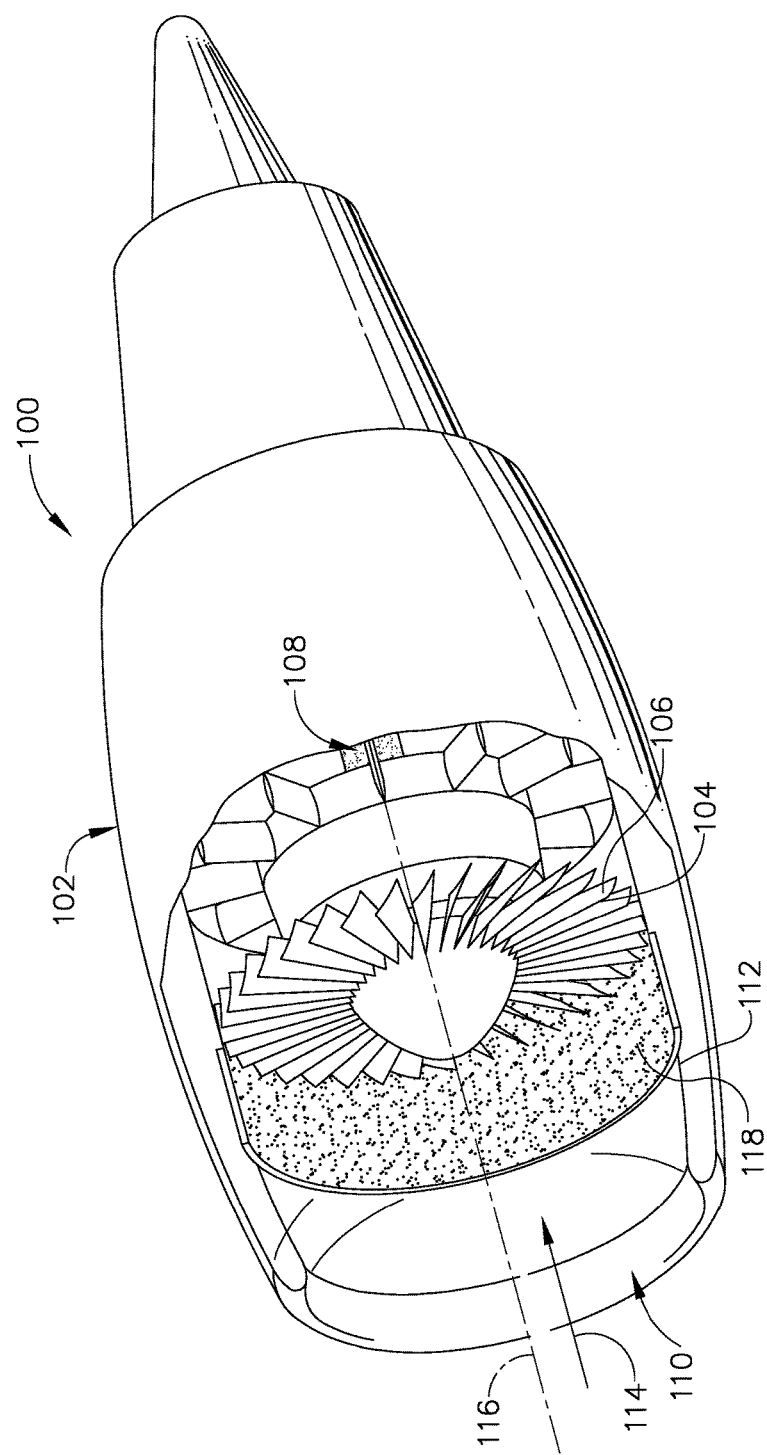
FIG. 1 is a perspective partial cutaway view of a gas turbine engine in accordance with an exemplary embodiment of the present disclosure.

Referring to the drawings wherein identical reference numerals denote the same elements throughout the various views, FIG. 1 shows a general orientation of a turbofan engine 100 in a perspective partial cutaway view, in accordance with an exemplary embodiment of the present disclosure. In the exemplary embodiment, turbofan engine 100 is embodied in a high-bypass turbofan jet engine for powering an aircraft (not shown) in flight. Turbofan engine 100 typically will be attached to the wings, fuselage, or tail (also not shown) of the aircraft through appropriate mountings.

Turbofan engine 100 includes a nacelle, or fan casing, 102 surrounding a fan rotor 104, which includes a plurality of circumferentially spaced fan blades 106 powered by power turbine 108. Nacelle 102 defines a fan duct 110 having a duct inner wall 112 that receives an ambient inlet airflow 114 flowing downstream through fan rotor 104 along a longitudinal axial centerline 116. An acoustic liner 118 is disposed along duct inner wall 112. In an exemplary embodiment, acoustic liner 118 is disposed along duct inner wall upstream of fan blades 106. Additionally or alternatively, acoustic liner 118 is has an annular construction and is disposed duct inner wall 112 downstream of fan blades 106, and/or along nonrotating portions of nacelle 102 or other components, ducts, or casings within turbofan engine 100 where noise suppression is appropriate, or which are capable of intercepting and suppressing high frequency noise.

As used herein, the terms "upstream" and "downstream" generally refer to a position in a jet engine in relation to the ambient air inlet and the engine exhaust at the back of the engine. For example, the inlet fan is upstream of the combustion chamber. Likewise, the terms "fore" and "aft" generally refer to a position in relation to the ambient air inlet and the engine exhaust nozzle.

In operation, fan rotor 104 rotates within fan nacelle 20, producing discrete tonal noise predominately at the blade passage frequency and multiples thereof. During takeoff of the aircraft, when fan blades 106 of fan rotor 104 reach transonic and supersonic velocities operation, noise is generated therefrom and propagated out of the fan duct 110 into the surrounding environment. In the exemplary embodiment, acoustic liner 118 serves to suppress noise resonating at a blade passage frequency (BPF) and harmonics of the BPF. Acoustic liner 118 is configured to absorb sound waves and thereby reduce the level of sound waves radiating from fan duct 110.

Figure 2:
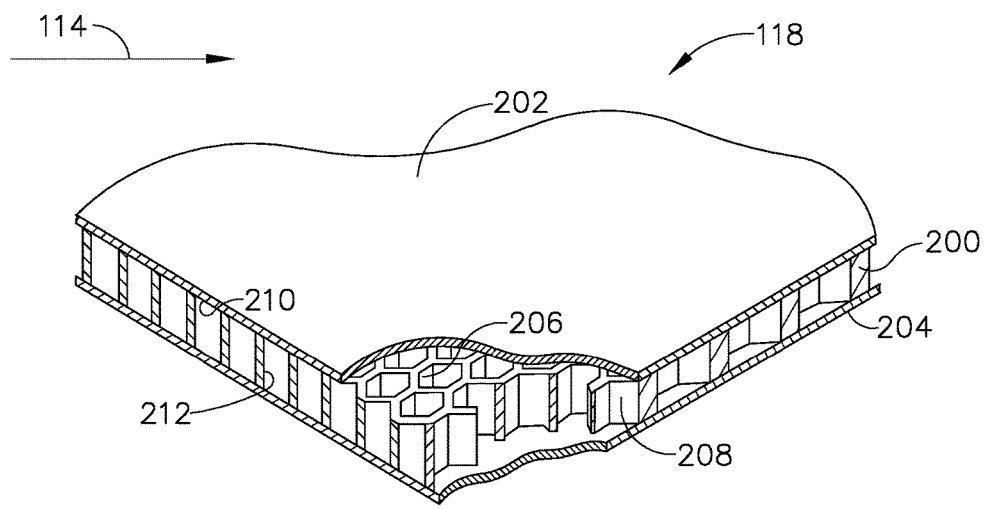
FIG. 2 is an isometric partial cutaway view of the acoustic liner depicted in FIG. 1.
Figure 3:
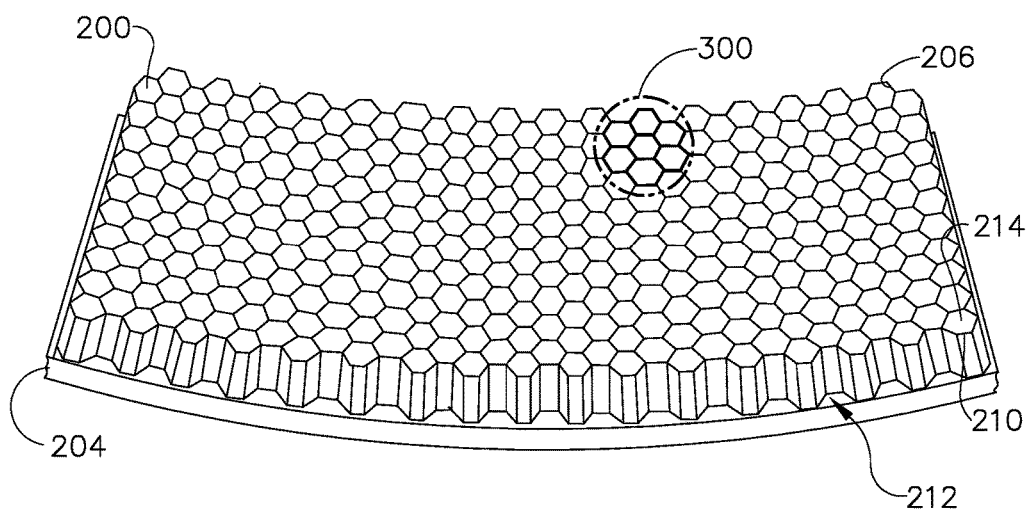
FIG. 3 is a perspective view of the honeycomb structure of the acoustic liner depicted in FIGS. 1-2.

FIG. 2 is an isometric partial cutaway view of a portion of acoustic liner 118 depicted in FIG. 1, disposed proximate airflow 114, in accordance with an exemplary embodiment. Acoustic liner 118 includes a core layer 200 topped by a perforated face sheet 202, and backed by an imperforate backing sheet 204. Core layer 200 has a cellular honeycomb structure formed of a plurality of partitioned laterally adjoining hexagonal cells, or cavities, 206, as best seen in FIG. 3. In an exemplary embodiment, individual cells 206 are shaped as hexagonal tubes, sometimes referred to as hollow hexagonal prisms, each sharing one lateral rectangular facet, or wall, 208 with an adjacent cell 206. The lateral rectangular walls 208 align parallel to the c-axis (not shown, described below with respect to FIG. 6) of the respective hexagonal prism structure to which they partition.

Face sheet 202 is attached to an inner side 210 of core layer 200 and backing sheet 204 is attached to an outer side 212 of core layer 200. In this exemplary embodiment, the terms "inner" and "outer" refer to the orientation of the respective layers in relation to longitudinal axial centerline 116, shown in FIG. 1. Face sheet 202 and backing sheet 204 can be attached to core layer 200 by adhesive bonding, for example, by thermal, sonic, and or electric welding processes. Acoustic liner 118 is secured within turbofan engine 100 by attaching backing sheet 204 to duct inner wall 112, shown in FIG. 1, by conventional attachment means.

Face sheet 202 is formed of a porous material, such as a wire mesh, a perforated sheet, or a woven or nonwoven fibrous material. Core layer 200 is molded, or fabricated by an accumulative manufacturing process, such as 3-D printing. The ability of acoustic liner 118 to attenuate noise at a desired frequency, or range of frequencies, is dependent on its acoustic impedance, which is a function of a number of parameters, including the depth of the cavities 206, as well as the resident volume contained therein.

FIG. 3 is a perspective view of the honeycomb structure of core layer 200 of acoustic liner 118, as shown in FIGS. 1-2. For illustrative purposes face sheet 202 is removed from the view illustrated in FIG. 3. For further illustrative purposes, an individual heptad 300 of seven adjoining cells 206 is bolded and shown in the dashed circle. Heptad 300 is formed of seven contiguous adjacent resident cavities arranged substantially parallel to one another, in the lateral direction. As illustrated in FIG. 3, inner side 210 of core layer 200 forms a hexagonal grid by a tessellation of regular hexagonal openings 214 that generally align in a plane where inner side 210 fixedly joins face sheet 202.

Figure 4:
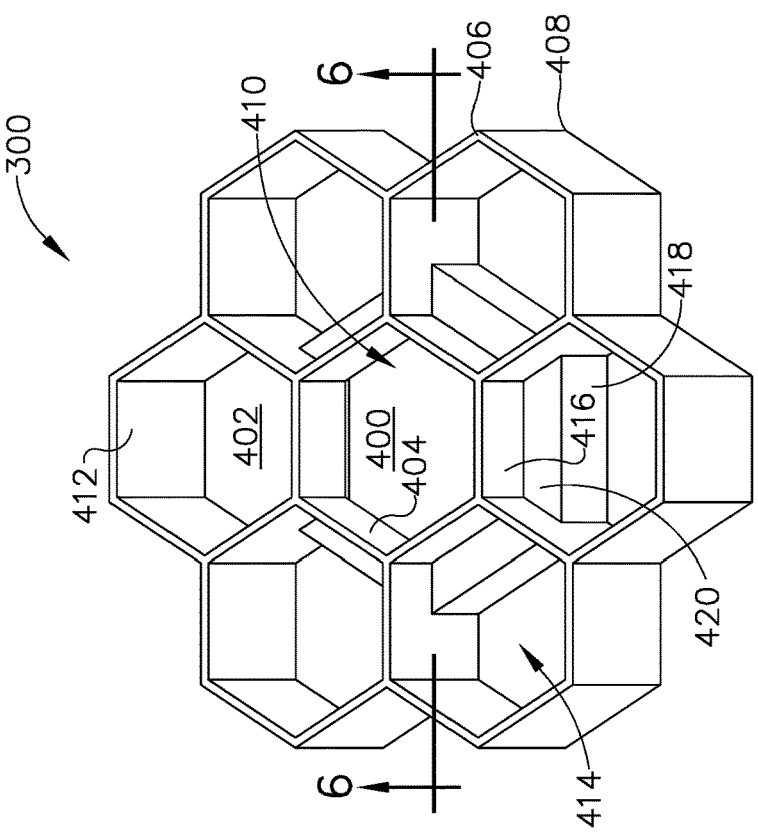
FIG. 4 is a top perspective view of the heptad honeycomb structure depicted in FIG. 3.

FIG. 4 is a top perspective view of heptad 300 shown in FIG. 3. A single heptad 300 is shown for illustrative purposes, and is not intended to be limiting. Heptad 300 includes a central hexagonal tube 400 radially surrounded by six adjacent hexagonal tubes 402. Central hexagonal tube 400 includes six central lateral walls 404 arranged evenly about a central axis (not shown, described below with respect to FIG. 6) of central hexagonal tube 400. Each of central lateral walls 404 extend laterally from a first tube end 406 to a second opposing tube end 408. In an exemplary embodiment, first tube end 406 aligns with inner side 210, shown in FIGS. 2-3, and attaches to face sheet 202 in the formation of acoustic liner 118, shown in FIG. 2. The joining of six central lateral walls 404 together at first tube end 406 defines a first central hexagonal base opening 410 of central hexagonal tube 400.

Figure 9:
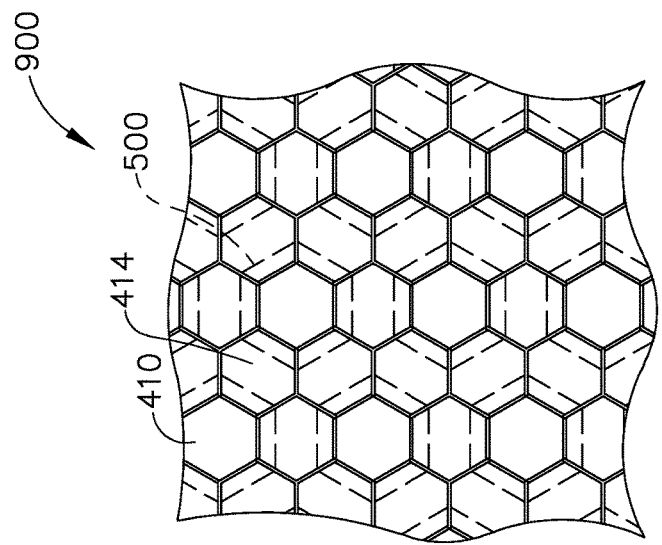
FIG. 9 is an overhead plan view of the heptads depicted in FIGS. 4-5 and 7 in accordance with an alternative embodiment of the present disclosure.
Figure 8:
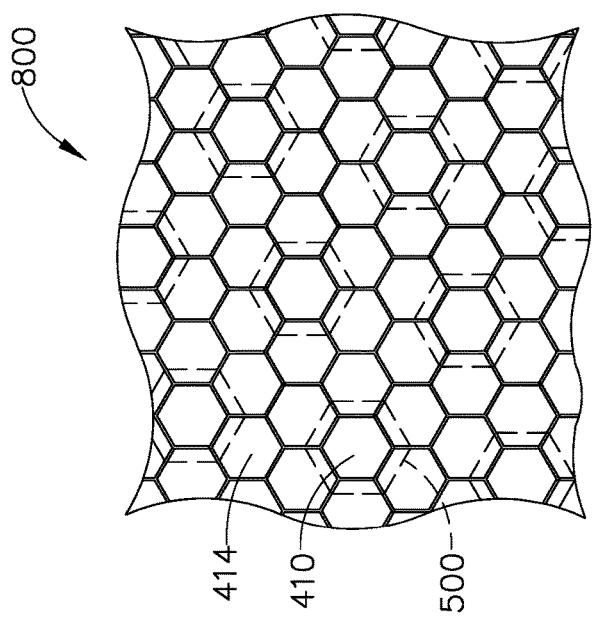
FIG. 8 is an overhead plan view of the heptads depicted in FIG. 4-6 in accordance with one embodiment of the present disclosure.

Each of adjacent hexagonal tubes 402 similarly extends laterally from first tube end 406 to second opposing tube end 408, and the joining of adjacent lateral walls 412 together at first tube end 406 defines a first adjacent hexagonal base opening 414. According to this exemplary embodiment of heptad 300, for each adjacent hexagonal tube 402, one of its adjacent lateral walls 412 is one of central lateral walls 404 of central hexagonal tube 400. That is, each adjacent hexagonal tube 402 shares one lateral wall, i.e., central lateral wall 404, in common with central hexagonal tube 400. In the exemplary embodiment, first central hexagonal base opening 410 and first adjacent hexagonal base openings 414 are both regular hexagons of substantially the same size, and the array of first central hexagonal base openings 410 with first adjacent hexagonal base openings 414 forms a hexagonal grid, as shown in FIGS. 8 and 9, described further below.

Referring again to FIG. 4, in an exemplary embodiment, central lateral wall 404 is not a single polygon, but instead includes a first rectangular wall portion 416 and a second rectangular wall portion 418 separate from first rectangular wall portion 416, and disposed at a greater distance in the radial direction R from the central axis C of central hexagonal tube 400 (not numbered in FIG. 4, described below with respect to FIG. 6) than first rectangular wall portion 416. In the exemplary embodiment, first and second rectangular wall portions 416, 418 are generally parallel with the central axis of central hexagonal tube 400, and are joined by a radial shelf 420 extending in a direction generally perpendicular to the central axis and parallel with first base openings 410, 414. Radial shelf 420 thus forms a bent portion of central lateral wall 404. According to an exemplary embodiment, radial shelf 420 forms a trapezoidal shape.

In the exemplary embodiment described above, each central lateral wall 404 includes two rectangular wall portions 416, 418. According to an alternative embodiment, each central lateral wall 404 can include three or more discrete rectangular wall portions, with each pair of adjacent discrete rectangular wall portions connected by a separate radial shelf, such that central hexagonal tube 400 forms a hollow, stepped hexagonal pyramid. According to this alternative embodiment, when fabricated using an accumulative manufacturing process, a height of the discrete rectangular wall portions in the direction of the central axis can be as small as allowed by the accumulative manufacturing process, such that central lateral wall 404 forms a virtual trapezoid shape of the hexagonal pyramid, widening from first tube end 406 to second opposing tube end 408.

Figure 5:
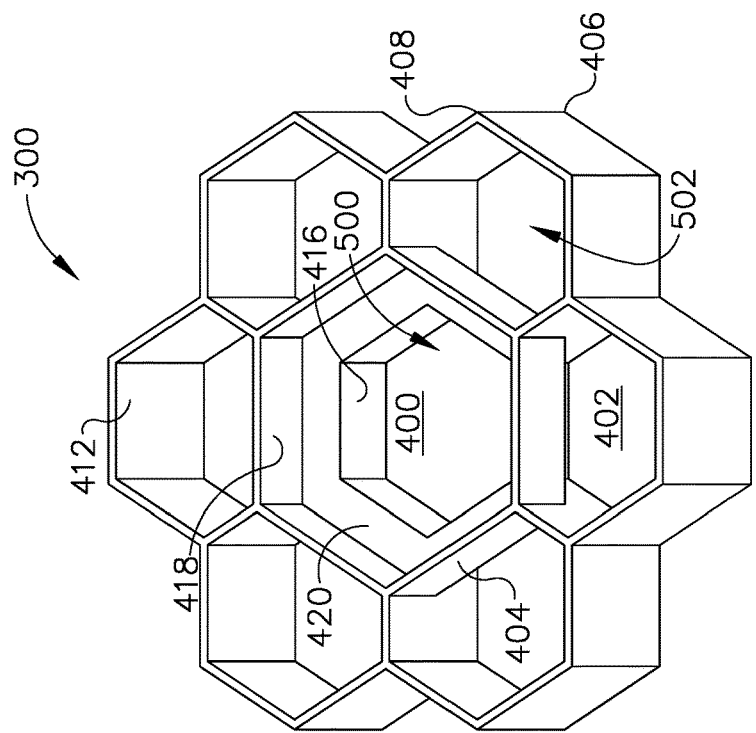
FIG. 5 is a bottom perspective view of the heptad depicted in FIG. 4.

FIG. 5 is a bottom perspective view of heptad 300 shown in FIGS. 3 and 4. As seen from the bottom perspective view, the joining of six respective second rectangular wall portions 418 of central lateral walls 404 together at second tube end 408 defines a second central hexagonal base opening 500 of central hexagonal tube 400. Similarly, the joining of adjacent lateral walls 412 together with common second rectangular wall portion 418 at second tube end 408 defines a second adjacent hexagonal base opening 502. In the exemplary embodiment, second central hexagonal base opening 500 is a regular hexagon having a greater area than first central hexagonal base opening 410. In contrast, second adjacent hexagonal base opening 502 is a convex irregular hexagon having a lesser area than first adjacent hexagonal base opening 414.

In operation, the internal hollow volume (not numbered) of central hexagonal tube 400 forms a resonant acoustic cavity that is tuned, at least in part, to frequencies corresponding to the internal volume of the expanded cavity. As further described with respect to FIG. 6, when seen from the top view looking in the direction of the central axis C, the expanded cavity thus includes an additional portion of the volume proximate second tube end 408 that extends into and underlies first adjacent hexagonal base opening 414 beneath radial shelves 420.

Figure 6:
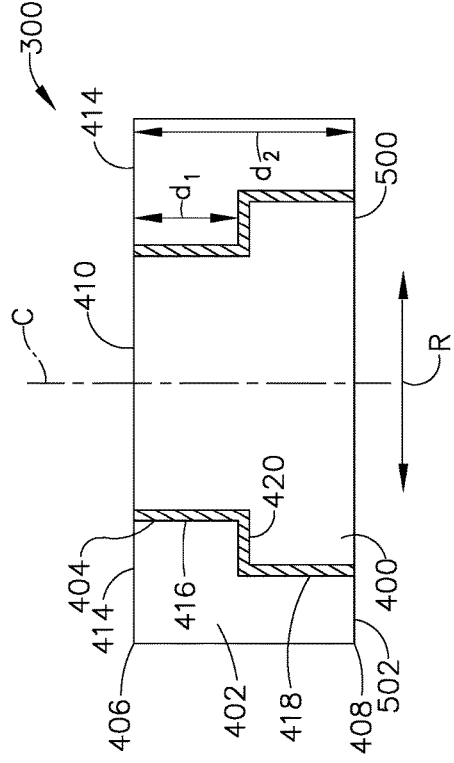
FIG. 6 is a cross-sectional view of the heptad taken along line 6-6 of FIG. 4.

FIG. 6 is a cross-sectional view of heptad 300 taken along line 6-6 of FIG. 4. FIG. 6 illustrates that the width of second central hexagonal base opening 500, and therefore also its area, when seen in the radial direction R, are greater than those of first central hexagonal base opening 410. The opposite is thus illustrated with respect to adjacent hexagonal tubes 402, where the width and area of first adjacent hexagonal base opening 414 are greater than those of second adjacent hexagonal base opening 502. In contrast, when seen in the direction of axis C, each adjacent hexagonal tube includes one region (not separately numbered) having a first full depth $d_1$ spanning the entire axial distance between first tube end 406 and second tube end 408, and a second region (also not numbered) having a second partial depth $d_2$ spanning the axial distance between first tube end 406 and radial shelf 420.

According to the exemplary embodiment shown in the sectional view of FIG. 6, first central hexagonal base opening 410 and first adjacent hexagonal base opening 414 align along first tube end 406, and second central hexagonal base opening 500 and second adjacent hexagonal base opening 502 align along second tube end 408. Additionally, first central hexagonal base opening 410 is generally parallel to second central hexagonal base opening 500, and first adjacent hexagonal base opening 414 is generally parallel to second adjacent hexagonal base opening 502.

By this exemplary configuration, the interior volume of central hexagonal tube 400 is greater than that of individual adjacent hexagonal tubes 402, with the two respective interior volumes corresponding to at least two different noise suppression frequencies, respectively. Furthermore, by configuring the two respective volumes to overlap, when seen in the direction of central axis C, over radial shelves 420, heptad 300 effectively utilizes the entire depth of core layer 200, shown in FIGS. 2 and 3, in an SDOF liner construction. The SDOF liner construction of heptad 300 though, realizes the multiple frequency suppression features of a 2DOF liner, but without requiring the additional core layer required by a 2DOF liner, and without leaving unused solid layer material beneath smaller-volume cells as seen in conventional variable depth SDOF liners. As described below with respect to FIGS. 7-9, additional acoustic suppression frequencies can be realized by the arrangement of individual heptads 300 in relative proximity to one another throughout core layer 200.

Figure 7:
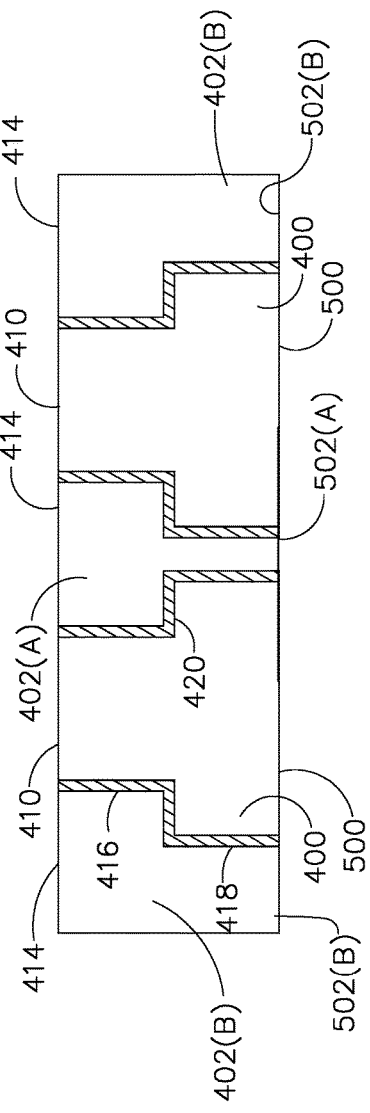
FIG. 7 is a cross-sectional view of two adjacent heptads from FIG. 6 according to an alternative arrangement.

FIG. 7 is a cross-sectional view of two adjacent heptads 300 from FIG. 6 according to an alternative arrangement. Heptads 300 of FIG. 7 are identical to heptad 300 of FIG. 6, except that individual heptads 300 can be distributed within core layer 200 in such close proximity to one another that two adjacent heptads 300 can overlap to share an adjacent hexagonal tube 402(A) in common, as further described below with respect to FIG. 9. As shown in FIG. 7, an adjacent hexagonal tube 402(A) shared in common between two adjacent heptads 300 will contain two radial shelves 420 within the same interior volume of adjacent hexagonal tube 402(A).

In this alternative embodiment, only one adjacent hexagonal tube 402(A) is shared in common between two individual heptads 300, with opposite adjacent hexagonal tubes 402(B) containing only one radial shelf 420 within their respective interior volumes. According to this alternative configuration, at least three separate volumes are realized by the uneven distribution of heptads 300 proximate one another in the same SDOF core layer 200, and thus at least three different main acoustic suppression frequencies as well. Further and uneven spacing distributions of heptads 300 throughout core layer 200 can additionally place one or more regular hexagonal tubes, that is, hexagonal tubes having no radial shelves therein, between individual heptads 300, thereby realizing at least a fourth different suppression frequency for the same SDOF core layer 200.

FIG. 8 is an overhead plan view of an exemplary even tessellation 800 of heptads 300, shown in FIGS. 4-6. Tessellation 800 illustrates an even distribution of individual heptads 300 in a hexagonal grid of first central hexagonal base openings 410 and first adjacent hexagonal base openings 414 such that every individual heptad 300 is immediately adjacent another heptad 300 without sharing common adjacent hexagonal tubes 402. In this even distribution, every hexagonal tube 402 would realize only one radial shelf 420 within its interior volume.

FIG. 9 is an overhead plan view of an alternative tessellation 900 of heptads 300, shown in FIGS. 4-5 and 7. Tessellation 900 illustrates an even distribution of individual heptads 300 in a hexagonal grid of first central hexagonal base openings 410 and first adjacent hexagonal base openings 414 similar to that of tessellation 800, described above. In tessellation 900, however, every individual heptad 300 is immediately adjacent another heptad 300 such that each heptad 300 shares at least adjacent hexagonal tube 402, e.g. adjacent hexagonal tube 402(A), shown in FIG. 7, in common with another heptad 300. In this even distribution, every hexagonal tube 402 would realize only two radial shelves 420 within its interior volume. In another alternative embodiment, individual heptads 300 can be unevenly staggered, as shown in FIG. 7, such that both single-shelf and double-shelf adjacent hexagonal tubes can be realized within the same SDOF core layer 200.

It is understood from the foregoing description and associated figures that the generally hexagonal shape of the contiguous adjacent cells is presented by way of example, and not in a limiting sense. Other polygonal or non-polygonal shapes may be utilized for the adjacent cells and still fall within the scope of the SDOF acoustic liner described herein, the adjacent cells of which have overlapping volumes, and realize two or more different acoustic suppression frequencies by the volumes defined therein. For example, for the seven-cell heptad embodiments described above, adjacent cells surrounding the heptad central cell may include a respective radial shelf disposed at a different height between the porous face sheet and the backing sheet, thereby defining up to seven separate acoustic suppression frequencies for one heptad. Alternatively, in a four-cell rectangular embodiment, three adjacent corner cells may include respective radial shelves that overlap a volume of a fourth corner cell that expands below the three adjacent volumes, thereby defining between two and four separate acoustic suppression frequencies. In a further alternative of the rectangular embodiment, one central square cell can be surrounded by eight adjacent cells in a nine-cell tessellated grid, thereby defining between three and nine separate acoustic suppression frequencies in one SDOF acoustic liner.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An acoustic honeycomb structure, comprising at least one heptad of contiguous adjacent resonant cavities arranged substantially parallel to one another in a hexagonal grid formation, wherein said at least one heptad comprises:

a central hexagonal tube comprising six lateral walls arranged evenly about a central tube axis, said six lateral walls each extending along said central tube axis from a first opposing tube end to a second opposing tube end, said six lateral walls defining a first central hexagonal base opening disposed at said first opposing tube end and a second central hexagonal base opening disposed at said second opposing tube end; and six adjacent hexagonal tubes radially surrounding said central hexagonal tube about said central tube axis, each of said six adjacent hexagonal tubes extending from said first opposing tube end to said second opposing tube end and including a first adjacent hexagonal base opening disposed at said first opposing tube end and a second adjacent hexagonal base opening disposed at said second opposing tube end, wherein said first central hexagonal base opening is generally parallel to said second central hexagonal base opening, wherein said first adjacent hexagonal base opening is generally parallel to said second adjacent hexagonal base opening, wherein said second central hexagonal base opening is larger than said first central hexagonal base opening, wherein each of said six lateral walls is commonly shared with a respective one of said six adjacent hexagonal tubes; and wherein said six lateral walls each comprise a first rectangular wall portion and a second rectangular wall portion.

2. The acoustic honeycomb structure as claimed in claim 1, wherein said second rectangular wall portion is disposed at a greater radial distance from said central tube axis than said first rectangular wall portion.

3. The acoustic honeycomb structure as claimed in claim 2, wherein each of said six lateral walls further comprises a radial shelf connecting said first rectangular wall portion with said second rectangular wall portion.

4. The acoustic honeycomb structure as claimed in claim 3, wherein said at least one heptad comprises a first heptad and a second heptad disposed adjacent said first heptad in said hexagonal grid formation.

5. The acoustic honeycomb structure as claimed in claim 4, wherein said first heptad shares one of said six adjacent hexagonal tubes in common with second heptad.

6. The acoustic honeycomb structure as claimed in claim 5, wherein said in common one of said six adjacent hexagonal tubes comprises at least two separate radial shelves of two separate central hexagonal tubes, respectively.

7. The acoustic honeycomb structure as claimed in claim 3, wherein said central hexagonal tube comprises a central interior volume, said each adjacent hexagonal tube comprises an adjacent interior volume, and said central interior volume is greater than said adjacent interior volume.

8. The acoustic honeycomb structure as claimed in claim 7, wherein said central interior volume corresponds to a first suppression frequency.

9. The acoustic honeycomb structure as claimed in claim 8, wherein said adjacent interior volume corresponds to a second suppression frequency different from said first suppression frequency.

10. The acoustic honeycomb structure as claimed in claim 7, wherein said central interior volume and said adjacent interior volume overlap over said radial shelf in the direction of said central tube axis.

11. The acoustic honeycomb structure as claimed in claim 1, wherein said first central hexagonal base opening and said first adjacent hexagonal base opening comprise regular hexagonal shapes.

12. The acoustic honeycomb structure as claimed in claim 8, wherein said first central hexagonal base opening has substantially the same dimensions as said first adjacent hexagonal base opening.

13. The acoustic honeycomb structure as claimed in claim 1, wherein said first adjacent hexagonal base opening is larger than said second adjacent hexagonal base opening.

14. The acoustic honeycomb structure as claimed in claim 1, wherein said second adjacent hexagonal base opening comprises an irregular convex hexagonal shape.

* * * * *